Patented July 27, 1937

2,088,333

UNITED STATES PATENT OFFICE 2,088,333

AZO DYES AND THEIR PRODUCTION

Mordecai Mendoza, Blackley, Manchester, England, assignor to Imperial Chemical Industries Limited, a corporation of Great Britain No Drawing. Application March 14, 1935, Serial No. 11,159. In Great Britain March 19, 1934

8 Claims. (Cl. 260—12.1)

This invention relates to dyestuffs, to methods of dyeing, and to dyed articles, and to new compositions of matter and new methods of making and using them.

An object of the invention is to dye materials with a new azo dye which has excellent color and good fastness to light. Another object of the invention is to prepare a superior dye of the so-called "direct cotton" class. Other objects of the invention will be in part apparent and in part hereinafter set forth.

The objects of the invention are accomplished, generally speaking, by coupling diazotized 6-chloro-2-aminophenol-4-sulfonic acid with the urea of 2-amino-5-naphthol-7-sulfonic acid in aqueous alkaline medium and treating the resulting product with a copper-containing reagent. The objects of the invention are accomplished in a greater or less degree by the details of the means and methods hereinafter set forth.

According to this invention we manufacture a new copper-containing direct azo dye by combining two molecules of diazotized 6-chloro-2-aminophenol-4-sulfonic acid with one molecule of the urea of 2-amino-5-naphthol-7-sulfonic acid in aqueous alkaline medium and treating the resulting dyestuff with copper or an agent yielding copper to convert it to a copper-containing azo dye. Conversion takes place easily and the copper-containing direct dye dyes cotton in bluish-red shades of very good to excellent fastness to light.

The following example, in which parts are by weight, illustrates but does not limit the invention.

Example 22.35 parts of 6-chloro-2-aminophenol-4-sulfonic acid are dissolved by warming in 400 parts of water. The solution obtained is made definitely acid to Congo red by adding 25 parts of hydrochloric acid (36%), cooled to 5° C. and diazotized at this temperature by means of 6.9 parts of sodium nitrite.

The diazo solution is then added with stirring to a solution of 25.2 parts of 5,5'-dihydroxy-2,2'-dinaphthylurea-7,7'-disulfonic acid in 400 parts of water containing 50 parts of anhydrous sodium carbonate at 10° C. Coupling gives a reddish blue solution and when complete the dyestuff is precipitated from it by neutralizing and adding common salt. The dyestuff is filtered off, the paste is redissolved in 1000 parts of warm water, a solution of 25 parts of copper sulfate crystals in 100 parts of water is added and the mixture boiled for about one hour. Sufficient anhydrous sodium carbonate is then added to make the reaction alkaline to litmus paper, the copper complex is filtered off, dried, and ground.

When dyed in cotton it yields bluish-red shades of very good to excellent fastness to light.

As many apparently widely different embodiments of this invention may be made without departing from the spirit and scope thereof, it is to be understood that I do not limit myself to the specific embodiments thereof except as defined in the appended claims.

I claim:

1. A composition of matter being the coupling product of diazotized 6-chloro-2-aminophenol-4-sulfonic acid with the urea of 2-amino-5-naphthol-7-sulfonic acid.

2. A composition of matter being the copper-containing coupling product of diazotized 6-chloro-2-aminophenol-4-sulfonic acid with the urea of 2-amino-5-naphthol-7-sulfonic acid.

3. The method of making a dyestuff which comprises making a copper complex of the product produced by coupling two mols of diazotized 6-chloro-2-aminophenol-4-sulfonic acid with one mol. of the urea of 2-amino-5-naphthol-7-sulfonic acid.

4. The method of making a dyestuff which comprises coupling diazotized 6-chloro-2-aminophenol-4-sulfonic acid with the urea of 2-amino-5-naphthol-7-sulfonic acid.

5. A process for the manufacture of a new copper-containing azo dyestuff which comprises coupling two molecular proportions of diazotized 6-chloro-2-aminophenol-4-sulfonic acid with one molecular proportion of the urea of 2-amino-5-naphthol-7-sulfonic acid in an alkaline medium and thereafter treating the resulting dyestuff with an agent yielding copper.

6. The method of making a dyestuff which comprises coupling diazotized 6-chloro-2-aminophenol-4-sulfonic acid with the urea of 2-amino-5-naphthol-7-sulfonic acid and reacting the product with copper.

7. The method of making a dyestuff which comprises diazotizing two mols of 6-chloro-2-aminophenol-4-sulfonic acid, coupling it with 5,5'-dihydroxy-2,2'-dinaphthylurea-7,7'-disulfonic acid at low temperature, and reacting the dyestuff in water solution and at elevated temperature with copper sulfate.

8. The method of making a dyestuff which comprises diazotizing 22.35 parts of 6-chloro-2-aminophenol-4-sulfonic acid, adding it to an agitated bath containing 25.2 parts of 5,5'-dihydroxy-2,2'-dinaphthylurea-7,7'-disulfonic acid, 400 parts water and 50 parts sodium carbonate at 10° C., neutralizing, salting out, and separating the dyestuff, dissolving the dyestuff in water and reacting the dyestuff with copper sulfate solution at elevated temperature, making the solution basic to litmus, and filtering.

MORDECAI MENDOZA.